Aug. 23, 1927.　　　　　S. C. WILSON　　　　　1,639,916
EAVES TROUGH HANGER
Filed Aug. 6, 1925
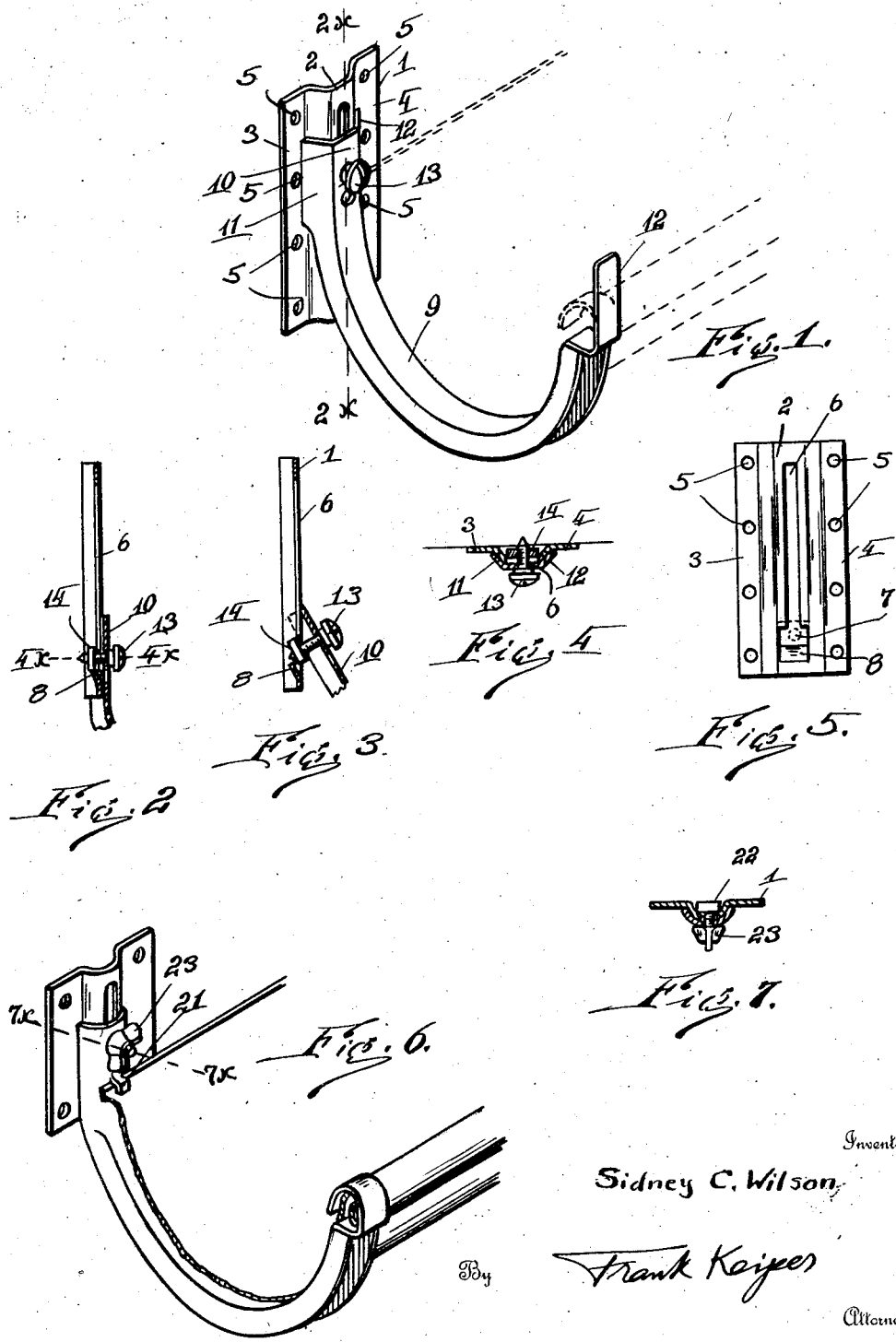
Inventor
Sidney C. Wilson
By Frank Keiper
Attorney Patented Aug. 23, 1927.

1,639,916

UNITED STATES PATENT OFFICE.

SIDNEY C. WILSON, OF PITTSFORD, NEW YORK, ASSIGNOR TO THE KNAB CORPORATION, OF ROCHESTER, NEW YORK, A CORPORATION OF NEW YORK.

EAVES-TROUGH HANGER.

Application filed August 6, 1925. Serial No. 48,515.

The object of this invention is to provide an improved mount for an eaves trough hanger.

This and other objects of the invention will be fully illustrated in the drawings, described in the specification and pointed out in the claims at the end thereof.

In the accompanying drawing:

Figure 1 is a perspective view of the eaves trough hanger and its mounting or support.

Figure 2 is a vertical section through the trough and hanger on the line $2^x$—$2^x$ of Figure 1, the hanger being shown partly broken away.

Figure 3 is a vertical section through the hanger and the support therefor showing the hanger in process of being attached to the support, the hanger being shown partly broken away.

Figure 4 is a horizontal section on the line $4^x$—$4^x$ of Figure 2.

Figure 5 is a front elevation of the support.

Figure 6 is a perspective view of a modified form of the mounting for eaves trough hangers.

Figure 7 is a horizontal section on the line $7^x$—$7^x$ of Figure 6.

In the several figures of the drawings, like reference numerals indicate like parts.

In Figure 1 reference numeral 1 indicates the support which consists of a sheet or plate of metal bent to form the channel 2 with the flanges 3 and 4 on each side thereof. The flanges are perforated with the holes 5, 5 through which can pass nails or screws by which it is fastened in place to the woodwork of the house. In the channel is cut a slot 6 having parallel sides which slot is widened out at the bottom as indicated at 7. The plate at the bottom of the slot is bent rearward as indicated at 8 to form a shoulder that will engage the nut which forms part of the fastening for the hanger.

The hanger 9 is formed of a channel having parallel flanges which is bent to the form of a half cylinder. At one end 10 the base of the channel is left straight or tangential instead of curved and the flanges are flared out as indicated at 11 and 12 to correspond to the shape of the channel in the support 1. At the other end the flanges are cut away leaving an extension $11^A$ which is long and narrow corresponding in width to the base of the channel which extension is bent to the form shown in full lines in Figure 1 and which when the spout is in place may be bent to the form shown in dotted lines in Figure 1.

The straight portion 10 of the hanger 9 is perforated with two or more holes through either one of which a screw 13 can extend. The shank of the screw extends through the slot 6 in the support and engages the nut 14 behind the support 1. The screw and bolt can be put in position on the hanger and then inserted into engagement with the support by passing the nut through the enlarged opening 7 at the bottom of the slot as shown in Figure 3 and then bringing the parts to the position shown in Figure 2 after which the screw can be turned to bring the nut tightly up into place. In this position the nut can be clamped in place at any place along the slot 6. When the nut is at the bottom of the slot the nut 14 will rest on the shoulder 8. The top of the nut will then engage with the plate at either side of the narrow slot as shown in Figure 5. The hanger bolt and nut complete can only be disengaged from the plate at this point and then only by first loosening the screw and tilting the parts to the position shown in Figure 3. The width of the channel in the plate 1 is a little wider than the nut 14 but is narrow enough to keep the nut from turning as the screw turns so that the tightening of the nut on the screw is ensured by the turning of the screw. The screw 13 is provided with a shouldered head. That is, a shoulder is provided between the stem of the screw and the head. This shoulder holds the head away from the hanger leaving an opening between them so that the edge of the trough can engage under the head of the screw and abut against the shoulder. In this way the screw positively fastens the trough in place on one side and the extension 12 fastens the trough in place on the other side.

It will also be noticed that the stem of the screw has a sharp point on the end thereof and is long enough so that when the screw is in clamping position it will penetrate or engage with the woodwork to which the plate 1 is attached. This further helps to hold the hanger in position and keep it from slipping.

It will be seen that the parts for this construction are easily made, that the hanger and support are easily brought together and that the hanger can be adjusted to and clamped in position at any desired point on the support.

In Figure 6 I have shown a modification of the hanger in which a lug or lip 21 is struck up from the hanger. This lip is adapted to engage over the edge of the trough and hold it in place. In this form I prefer to use a bolt 22 having a square head engaging in the channel in the plate 1. The stem of the bolt passes outward through the slot in the supporting plate and the hole in the hanger and the parts are clamped together by the wing nut 23 which makes a threaded engagement with the stem of the bolt.

I claim:

1. In an eaves trough hanger, the combination of a support consisting of a plate of metal having a channel formed midway thereof and extending outwardly therefrom, said channel having a narrow slot in the base thereof and a wide opening at the end of said slot.

2. In an eaves trough hanger, the combination of a support consisting of a plate of metal having a channel formed midway thereof and extending outwardly therefrom, said channel having a narrow slot in the base thereof and a wide opening at the end of said slot, said plate being bent rearward at the bottom of the slot to form a shoulder therein.

3. In an eaves trough hanger, the combination of a hanger comprising a body portion having parallel flanges, said body portion having the outline of a semi-cylinder, said body portion having one end thereof extending straight or tangential thereto, said straight portion having the flanges flared outwardly, a support consisting of a plate of metal having a channel formed midway thereof and extending outwardly therefrom, said channel having sloping sides with which the flaring flanges of the hanger engage to nest the channel of the support therein, said channel having a narrow slot in the base thereof and a wide opening at the end of said slot, a bolt for fastening said hanger to said support, said bolt comprising a screw and a nut, the screw of said bolt passing through said hanger and through the slot in said support, a nut in the channel of the support with which said screw engages.

4. In an eaves trough hanger, the combination of a hanger comprising a body portion having parallel flanges, said body portion having the outline of a semi-cylinder, said body portion having one end thereof extending straight or tangential thereto, said straight portion having the flanges flared outwardly, a support consisting of a plate of metal having a channel formed midway thereof and extending outwardly therefrom, said channel having sloping sides with which the flaring flanges of the hanger engage to nest the channel of the support therein, said channel having a narrow slot in the base thereof and a wide opening at the end of said slot, a bolt for fastening said hanger to said support, said bolt comprising a screw and a nut, the screw of said bolt passing through said hanger and through the slot in said support, a nut in the channel of the support with which said screw engages, said screw having a pointed end that projects beyond the supports and engages with the wood work.

In testimony whereof I affix my signature.

SIDNEY C. WILSON.